United States Patent
Sellers

(10) Patent No.: US 9,563,281 B2
(45) Date of Patent: Feb. 7, 2017

(54) KEYBOARD ILLUMINATION APPARATUS AND METHOD

(75) Inventor: Charles A. Sellers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1552 days.

(21) Appl. No.: 13/128,635

(22) PCT Filed: Nov. 11, 2008

(86) PCT No.: PCT/US2008/083131
§ 371 (c)(1),
(2), (4) Date: May 10, 2011

(87) PCT Pub. No.: WO2010/056235
PCT Pub. Date: May 20, 2010

(65) Prior Publication Data
US 2011/0221617 A1    Sep. 15, 2011

(51) Int. Cl.
*H03K 17/94*    (2006.01)
*H03M 11/00*    (2006.01)
*G06F 3/02*    (2006.01)
*F21V 8/00*    (2006.01)

(52) U.S. Cl.
CPC ........... *G06F 3/0202* (2013.01); *G02B 6/0016* (2013.01)

(58) Field of Classification Search
USPC ........ 341/22, 20, 29, 30, 173, 187; 345/168; 380/52; 400/472; 708/142
See application file for complete search history.

(56) References Cited

U.S. PATENT DOCUMENTS

| | | | | |
|---|---|---|---|---|
| 4,177,501 A * | 12/1979 | Karlin | ............................ | 362/26 |
| 5,053,928 A | 10/1991 | Pasco | | |
| 5,612,692 A * | 3/1997 | Dugas et al. | .................... | 341/22 |
| 5,746,493 A * | 5/1998 | Jonsson et al. | ............... | 362/602 |
| 6,860,612 B2 * | 3/2005 | Chiang et al. | .................. | 362/29 |
| 7,172,303 B2 * | 2/2007 | Shipman et al. | ............... | 362/29 |
| 2005/0270760 A1 | 12/2005 | Hung | | |
| 2006/0028792 A1 | 2/2006 | Wu | | |

(Continued)

FOREIGN PATENT DOCUMENTS

| CN | 2745289 | 12/2005 |
|---|---|---|
| CN | 201145127 | 11/2008 |

(Continued)

OTHER PUBLICATIONS

WIPO, International Search Report, Aug. 11, 2009, PCT/US2008/083131, International Filing Date Nov. 11, 2008.

(Continued)

*Primary Examiner* — Emily C Terrell
(74) *Attorney, Agent, or Firm* — HP Inc. Patent Department

(57) ABSTRACT

Interface apparatus and methods are provided. The interface can include a keyboard (200) containing one or more keys (210), each having a key base and a key top. A light guide (110) having an edge (125), a first surface (115) and a second surface (120) can be disposed proximate the base of all or a portion of the plurality of keys. The light guide can have a plurality of apertures (130) disposed therethrough, with each aperture corresponding to the location of each of the one or more keys. One or more dispersion features (135) can be disposed in, on, or about each of the one or more apertures to transmit at least a portion of the light from the light guide to the base of each key.

15 Claims, 3 Drawing Sheets

(56) References Cited

U.S. PATENT DOCUMENTS

2006/0092619 A1    5/2006  Hsu et al.
2007/0257822 A1   11/2007  Lee et al.
2009/0121904 A1*   5/2009  Liu et al. ........................ 341/22

FOREIGN PATENT DOCUMENTS

| JP | 63129392 | 6/1988 |
| KR | 100754686 | 9/2007 |
| KR | 10-2008-0008207 | 1/2008 |

OTHER PUBLICATIONS

UKIPO, First Office Action dated Apr. 23, 2012, cited in related counterpart case, GB App No. 1108217.9, filed May 17, 2011.
UKIPO, Second Office Action dated Sep. 5, 2012, cited in related counterpart case, GB App No. 1108217.9, filed May 17, 2011.

* cited by examiner

US 9,563,281 B2

KEYBOARD ILLUMINATION APPARATUS AND METHOD

BACKGROUND OF THE INVENTION

Field of the Invention

Embodiments of the present invention generally relate to keyboards used on electronic devices. More particularly, embodiments of the present invention relate to the apparatus and methods for illuminating keyboards used on electronic devices.

Description of the Related Art

Many electronic devices use numeric or alphanumeric keyboards for user entry of data into the device, i.e. an input device. While desktop and other stationary electronic devices are frequently used only in high ambient light environments, mobile devices such as cellular telephones, portable computers, and personal data assistants are often used in low ambient light environments. Conventional keyboards, while satisfactory in high ambient light conditions, can be difficult to see, read, and/or use in low ambient light conditions.

Various techniques have been used to illuminate keyboards on electronic devices. One option is to illuminate the face or front of the keyboard using a small, external, lamp. External illumination however is inefficient as a large portion of the light is lost to the surrounding environment, thereby requiring the use of larger and/or brighter lamps. The use of larger and/or brighter lamps consumes significant power, an important consideration when dealing with mobile, battery powered, electronic devices.

A second option is to illuminate the rear of the keyboard using a backlight. Backlighting of keyboards using multiple light sources can result in uneven illumination of the keyboard unless some means to evenly distribute the light is provided.

SUMMARY OF THE INVENTION

An interface apparatus is provided. The interface can include a keyboard containing one or more keys, each having a key base and a key top. A light guide having an edge, a first surface and a second surface can be disposed proximate the base of all or a portion of the plurality of keys. The light guide can have a plurality of apertures disposed therethrough, with each aperture corresponding to the location of each of the one or more keys. One or more dispersion features can be disposed in, on, or about each of the one or more apertures to transmit, reflect, or otherwise direct at least a portion of the light transmitted through the light guide in an upward direction into each key base, thereby illuminating the one or more keys.

The interface can include a keyboard containing a plurality of keys, each key having a key base and a key top. The user interface can further include a light guide having one or more edges, a first surface and a second surface. The first surface of the light guide can disposed about the base of all or a portion of the plurality of keys. The light guide can have a plurality of apertures disposed therethrough, with each aperture forming the plurality of apertures corresponding to the location one or more keys forming the plurality of keys. One or more interior surfaces of each aperture can have one or more features disposed thereon to transmit at least a portion of the incident light from the light guide to the base of each key forming the plurality of keys. Additionally, one or more backing plates extending partially or completely beneath one or more of the keys forming the plurality of keys can also be provided.

A method of illuminating an interface apparatus is also provided. At least an edge of a light guide disposed within a keyboard can be illuminated using one or more light sources. The keyboard can include one or more keys, each key having a key base and a key top. The light guide can have an edge, a first surface, and a second surface. The first surface of the light guide can disposed proximate the key base of at least a portion of the one or more keys. The light guide can have one or more apertures disposed partially or completely therethrough. Each of the one or more apertures corresponding to the location one or more key bases. One or more dispersion features can be partially or completely disposed in, on, or about an interior surface of at least one of the one or more apertures. The one or more dispersion features can transmit at least a portion of the incident light from the light guide to the key base. Additionally, one or more backing plates can extend partially or completely beneath at least a portion of the one or more keys.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1A:
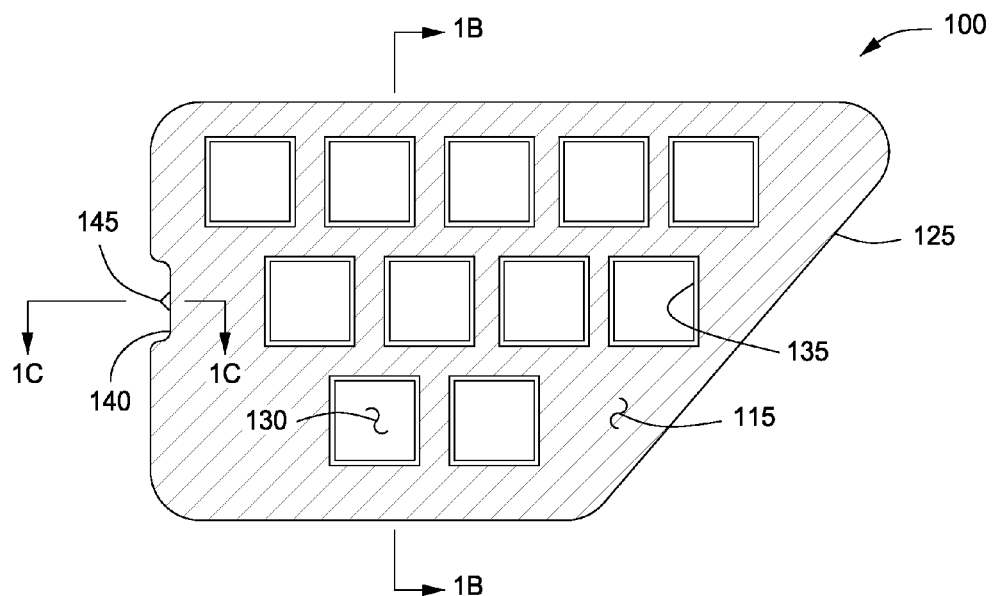
FIG. 1A depicts a plan view of an illustrative apparatus for illuminating an interface device, according to one or more embodiments described.
Figure 1B:
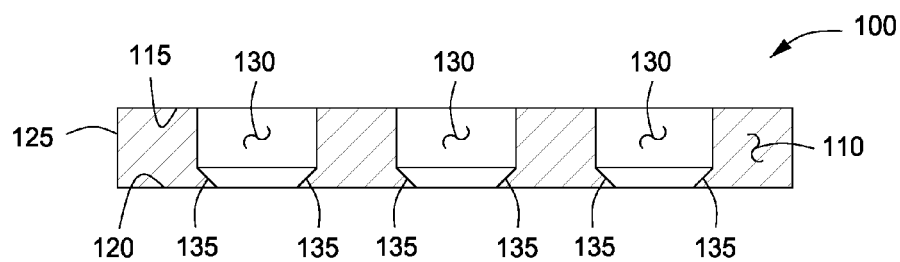
FIG. 1B depicts a cross-sectional view of the illustrative apparatus depicted in FIG. 1A, along sectional line 1B-1B, according to one or more embodiments described.
Figure 1C:
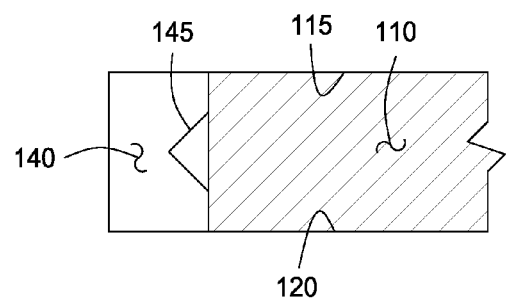
FIG. 1C depicts a cross-sectional view of the illustrative apparatus depicted in FIG. 1A, along sectional line 1C-1C, according to one or more embodiments described.

FIG. 1A depicts a plan view of an illustrative apparatus 100 for illuminating a user interface device, according to one or more embodiments. FIG. 1B depicts a cross-sectional view of the illustrative apparatus depicted in FIG. 1A, along sectional line 1B-1B, according to one or more embodiments. One or more features hidden in FIG. 1A are more clearly depicted in FIG. 1B. FIG. 1C depicts a cross-sectional view of the illustrative apparatus depicted in FIG. 1A, along sectional line 1C-1C, according to one or more embodiments. One or more features hidden in FIG. 1A are more clearly depicted in FIG. 1C. In one or more embodiments, the illustrative apparatus 100 can include a light guide 110 having a first ("upper") surface 115, a second ("lower") surface (not shown in FIG. 1A) 120, and at least one edge 125. One or more apertures 130 can be disposed in, on, or about the light guide 110. In one or more embodiments, the one or more apertures can extend partially or completely between the upper surface 115 and the lower surface 120 of the light guide 110. In one or more embodiments, one or more dispersion features 135 can be disposed in, on, or about the interior perimeter formed by the plurality of apertures 130.

As used herein, the terms "upper," "lower," and the like refer to the relative position of a first component with respect to the relative position of a second component and are not intended to denote a particular geometry, position, or spatial orientation.

In one or more embodiments, the one or more apertures 130 can be of uniform or non-uniform size and/or shape. In one or more specific embodiments, the one or more dispersion features 135 can be disposed in, on, or about all or a portion of the interior perimeter of at least one of the one or more apertures 130. In one or more embodiments, the one or more dispersion features 135 can focus, direct, redirect, or otherwise orient all or a portion of the light transmitted through the light guide 110 toward the upper surface 115 of the light guide 110. In one or more embodiments, all or a portion of the one or more dispersion features 135 can be opaque. In one or more embodiments, all or a portion of the one or more dispersion features 135 can be semi- or completely transparent. In one or more specific embodiments, a reflective coating can be disposed in, on, or about all or a portion of the one or more dispersion features 135.

The one or more dispersion features 135 can have any shape, size, or physical geometry. In one or more embodiments, the one or more dispersion features 135 can be wedge-shaped (as in the illustrative example depicted in FIG. 1B), hemispherical, pyramid-shaped, arcuate, trapezoidal, or any combination thereof. In one or more specific embodiments, the one or more dispersion features 135 can be wedge-shaped, having at least one surface forming the wedge co-planar with the lower surface 120 of the light guide 110. In one or more embodiments, the wedge-shaped dispersion feature 135 can have an apex angle of from about 10° to about 70°; about 15° to about 60°; or about 20° to about 50°.

In one or more embodiments, one or more recesses 140 can be disposed in, on, or about the edge 125 of the light guide 110. Although, in FIG. 1A, a single recess 140 is disposed along the edge 125 of the light guide 110, a plurality of recesses 140 can be similarly disposed evenly or unevenly about the edge 125 of the light guide 110.

Although not shown in FIG. 1A, in one or more embodiments, one or more recesses 140 can be disposed in, on, or about the upper surface 115 and/or lower surface 120 of the light guide 110. In one or more embodiments, all or a portion of the one or more recesses 140 can be disposed in, on, or about the upper surface 115 of the light guide 110, extending partially or completely through the light guide 110. In one or more embodiments, all or a portion of the one or more recesses 140 can be disposed in, on, or about the lower surface 120 of the light guide 110, extending partially or completely through the light guide 110. In one or more embodiments, a portion of the one or more recesses 140 can be disposed in, on, or about the upper surface 115 and/or lower surface 120 of the light guide 110, and a portion of the one or more recesses 140 can be disposed evenly or unevenly about the edge 125 of the light guide 110.

In one or more embodiments, one or more dispersion elements 145 can be disposed within each of the one or more recesses 140. The one or more dispersion elements 145 can evenly or unevenly distribute all or a portion of the light incident upon the recess 140 into the light guide 110. The one or more dispersion elements 145 can have any shape, size, or physical geometry, for example one or more wedges, cones, pyramids, trapezoids, or hemispheres. In one or more specific embodiments the one or more dispersion elements 145 can be a wedge shaped element having a base disposed proximate the light guide 110 and an apex disposed distal from the light guide 110. In one or more specific embodiments the one or more dispersion elements 145 can include, but is not limited to, a wedge shaped element having an apex angle of from about 90° to about 160°.

In one or more specific embodiments, the one or more dispersion elements 145 can include, but are not limited to, a hemispherical ("arcuate") shaped element having a base disposed proximate the light guide 110. In one or more specific embodiments the one or more dispersion elements 145 can include, but is not limited to, a hemispherical ("arcuate") shaped element having an apex angle of from about 90° to about 160°.

The light guide 110 can be formed using one or more translucent materials capable of transmitting light. In one or more embodiments, as depicted in FIG. 1A, the light guide 110 can be a single member having a plurality of apertures 130 disposed therethrough. In one or more embodiments, the light guide 110 can include a plurality of interconnected members, for example a plurality of hinged, or pivotable, members. The light guide 110 can have any geometry or configuration permitting disposal of the guide in, on, or about any electronic device, for example cellular telephones, personal data assistants and any other electronic device using non-standard keyboard as a user input device and/or user interface. In one or more embodiments, the thickness of the light guide 110 can range from about 1 mm to about 20 mm; from about 2 mm to about 13 mm; or about 2 mm to about 8 mm.

In one or more embodiments, the upper surface 115 of the light guide 110 can have a smooth or rough surface finish. In one or more embodiments, the surface finish on the upper surface 115 of the light guide 110 can be suitable for internally reflecting all or a portion of the light traveling through the light guide 110. In one or more embodiments, the surface finish on the upper surface 115 of the light guide 110 can be suitable for externally transmitting all or a portion of the light traveling through the light guide 110. In one or more embodiments the upper surface 115 of the light guide 110 can be translucent, permitting the transmission of all or a portion of the light within the light guide 110 to the external environment surrounding the light guide 110. In one or more embodiments, the upper surface 115 of the light guide 110 can be opaque, absorbing or internally reflecting all or a portion of the light within the light guide 110.

In one or more embodiments, a smooth or rough surface finish can be applied to the lower surface 120 of the light guide 110. In one or more embodiments, the surface finish on the lower surface 120 of the light guide 110 can internally reflect all or a portion of the light traveling through the light guide 110. In one or more embodiments, the surface finish on the lower surface 120 of the light guide 110 can externally transmit all or a portion of the light traveling through the light guide 110 to the external environment surrounding the light guide 110. In one or more embodiments the lower surface 120 of the light guide 110 can be translucent, permitting the transmission of all or a portion of the light within the light guide 110 to the external environment surrounding the light guide 110. In one or more embodiments, the lower surface 120 of the light guide 110 can be opaque, absorbing or internally reflecting all or a portion of the light within the light guide 110.

In one or more embodiments, a smooth or rough surface finish can be applied to the edge 125 bordering the light guide 110. In one or more embodiments, the surface finish on the edge 125 bordering the light guide 110 can be suitable for internally reflecting all or a portion of the light traveling through the light guide 110. In one or more embodiments, the surface finish on the edge 125 bordering the light guide 110 can be suitable for externally transmitting all or a portion of the light traveling through the light guide 110. In one or more embodiments the edge 125 bordering the light guide 110 can be translucent, permitting the transmission of all or a portion of the light within the light guide 110 to the external environment surrounding the light guide 110. In one or more embodiments, the edge 125 bordering the light guide 110 can be opaque, absorbing or internally reflecting all or a portion of the light within the light guide 110.

Figure 2A:
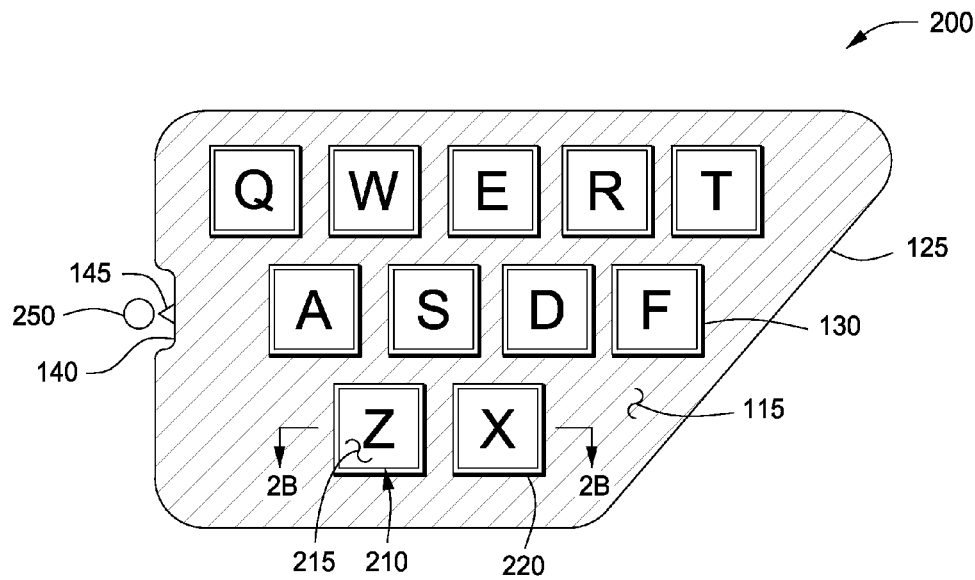
FIG. 2A depicts a plan view of an exemplary keyboard illuminated using the illustrative apparatus depicted in FIG. 1A, according to one or more embodiments described.
Figure 2B:
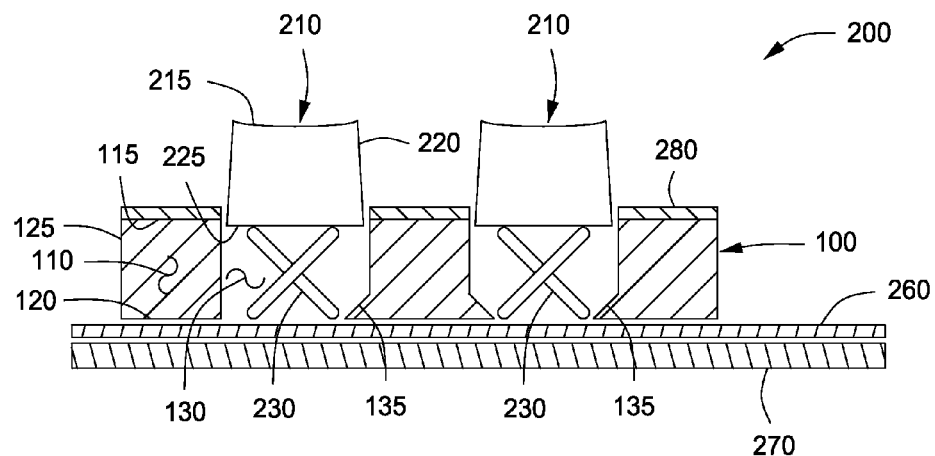
FIG. 2B depicts an elevation view of the exemplary keyboard depicted in FIG. 2A, according to one or more embodiments described.

FIG. 2A depicts a plan view of an exemplary keyboard 200 illuminated using the illustrative apparatus 100 depicted in FIG. 1A, according to one or more embodiments. In one or more embodiments, the exemplary keyboard 200 can include a plurality of keys 210, one or more light guides 110, and one or more light sources 250. FIG. 2B depicts an elevation view of the exemplary keyboard 200 depicted in FIG. 2A using the illustrative apparatus 100 depicted in FIG. 1A for illuminating the exemplary keyboard 200, according to one or more embodiments. FIG. 2B depicts one or more components not visible in the plan view depicted in FIG. 2A. In addition to the components listed in FIG. 2A, the illustrative keyboard 200 can include one or more reflective layers 260, and one or more stiffeners 270 disposed proximate the one or more light guides 110. As depicted in FIG. 2B, in one or more embodiments, the one or more keys 210 can be supported using a key switch 230 including, but not limited to, a scissors-switch, a dome-switch, a buckling-spring switch or the like.

The one or more keys 210 can be of any size, shape or configuration. In one or more embodiments, as depicted in FIG. 2B, each of the one or more keys 210 can have a key top 215, one or more key sides 220, and an open or closed base 225. All or a portion of the one or more keys 210 can be formed from a hard, resilient, material; a soft, flexible, material, or any combination thereof. In one or more specific embodiments, all or a portion of the one or more keys 210 can be roughly rectangular shaped as in, for example, the keys on a computer keyboard. In one or more specific embodiments, all or a portion of the one or more keys 210 can be circular or oval shaped as in, for example, the keys on a cellular telephone.

The one or more keys 210 can be formed from any material, including metallic materials, non-metallic materials, or any combination thereof. In one or more embodiments, the one or more keys 210 can be formed using one or more translucent or semi-translucent materials. In one or more embodiments, all or a portion of the one or more keys 210 can be formed using one or more translucent materials covered with one or more opaque materials except for one or more designs disposed on the key top 215. In one or more embodiments, all or a portion of the one or more keys 210 can be formed using one or more translucent materials that are left exposed except for one or more designs in an opaque material disposed on the key top 215.

As an illustrative example, the one or more keys 210 can be formed from a translucent material coated with a resilient opaque coating except for a capital letter "A" design disposed on the key top 215. Such a key design would permit the emission of light through the translucent key material and the capital letter "A" on the key top 215, while preventing the transmission of light from any other surface forming the one or more keys 210.

As another illustrative example, the one or more keys 210 can be formed from a translucent material left completely exposed except for a capital letter "A" design in an opaque material disposed on the key top 215. Such a key design would permit the emission of light through the translucent key material including the key top 215 and sides 220, while preventing the transmission of light through the capital letter "A" on the key top 215.

In one or more specific embodiments, the size and/or shape of the individual apertures 130 can be similar to the shape and/or size of the corresponding key base 225 disposed proximate the apertures 130. For example, if the key base 225 proximate the aperture 130 is circular, then the aperture 130 can be correspondingly circular with a diameter slightly greater than the key 210 to permit the user to depress the key 210 partially or completely into the aperture 130. Similarly, if the key base 225 proximate the aperture 130 is rectangular, then the aperture 130 can be correspondingly rectangular. In one or more embodiments, as depicted in FIG. 2B, the one or more apertures 130 disposed in, on, or about the light guide 110 can serve as a receptacle for the one or more keys 210 when the one or more keys 210 are depressed by a user.

In one or more embodiments, the light transmitted through the light guide 110 can be supplied via one or more light sources 250. In one or more embodiments, the one or more light sources 250 can be disposed proximate each of the one or more recesses 140. The particular location of the one or more light sources 250 with regards to the one or more recesses 140 can depend upon the presence, absence, size and/or type of one or more dispersion elements 145. In one or more specific embodiments, the one or more light sources 250 can be located at one or more focal points created by the one or more dispersion elements 145. Any form or type of light source 250 can be used to illuminate the light guide 110. The one or more light sources 250 can include, but are not limited to light emitting diodes (LEDs), standard or compact incandescent lamps, standard or compact fluorescent lamps, halogen lamps, or any combination thereof.

In one or more specific embodiments, one or more LEDs can be used to provide at least one of the one or more light sources 250. In one or more embodiments, the LEDs used to provide at least one of the one or more light sources 250 can include, but are not limited to, single color LEDs or multi-color LEDs. For example, in one or more embodiments, one or more white LEDs, suitable for transmitting "white" light into the light guide 110, can be used to provide the one or more light sources 250. In another example, in one or more embodiments, one or more multicolor, e.g., red/green LEDs, suitable for transmitting light at one or more specific frequencies into the light guide 110, can be used to provide one or more light sources 250. The use of LEDs to provide the one or more light sources can be advantageous due to the relatively low power consumption of LED devices compared to other light sources such as incandescent or fluorescent sources. In one or more embodiments, at least a portion of the one or more light sources 250 can include LEDs having any shape, for example round, square, rectangular, or triangular. In one or more embodiments, at least a portion of the one or more light sources 250 can include LEDs having any size, or diameter, including, but not limited to, about 1 mm or less; about 3 mm or less; about 5 mm or less; about 7 mm or less; or about 10 mm or less.

One or more layers 260 can be disposed proximate the lower surface 120 of the light guide 110. The one or more layers 260 can be a rigid, semi-rigid, or flexible material. The one or more layers 260 can extend partially or completely beneath all or a portion of the one or more keys 210, forming an impermeable barrier therebeneath. The one or more layers 260 can partially or completely cover, encapsulate, or otherwise enclose the one or more key switches 230 disposed in, on, or about the plurality of apertures 130, proximate each of the keys 210. In one or more embodiments, the one or more layers 260 can be permanently or temporarily attached or otherwise bonded to the lower surface 120 of the light guide 110 using one or more bonding agents, fasteners, adhesives, or combinations thereof.

In one or more embodiments, the one or more layers 260 can include one or more films or membranes suitable for reflecting all or a portion of the light incident upon the one or more layers 260. For example, the one or more layers 260 can include one or more mylar films, one or more poly-vinyl chloride (PVC) films, one or more cross-linked polymeric films, or a laminate containing combinations thereof. In one or more embodiments, all or a portion of the light transmitted from the light guide 110 via the lower surface 120 can be reflected back into the light guide 110 by the one or more layers 260. In one or more specific embodiments, the one or more layers 260 can partially or completely traverse all or a portion of the one or more apertures 130, thereby reflecting all or a portion of the incident light into the light guide 110 and/or key 210. In one or more specific embodiments, the reflective layer can include, but is not limited to a mylar film having a film thickness of from about 0.1 mm to about 0.7 mm; from about 0.2 mm to about 0.6 mm; or from about 0.3 mm to about 0.5 mm.

One or more stiffeners 270 can be disposed proximate the one or more layers 260. The one or more stiffeners 270 can be a single or multi-piece member extending partially or completely beneath all or a portion of the plurality of keys 210. The one or more stiffeners 270 can be fabricated using any suitable rigid material including, but not limited to, metallic materials, non-metallic materials, composite materials such as resin impregnated carbon fiber, multi-ply laminates thereof, or combinations thereof. In one or more embodiments, the one or more stiffeners 270 can have a thickness of from about 0.25 mm to about 7.5 mm; from about 0.35 mm to about 5 mm; or about 0.4 mm to about 3 mm.

In one or more specific embodiments, the one or more stiffeners 270 can be a single member extending continuously beneath the one or more apertures 130. In one or more specific embodiments, the one or more stiffeners 270 can be a multi-piece member extending continuously beneath the plurality of apertures 130 thereby permitting the "folding" of the keyboard 200. In one or more embodiments, the one or more layers 260 can be disposed proximate the surface of the stiffener 270 and proximate the second surface 120 of the light guide 110, thereby forming a "sandwich" or "laminate" of the one or more layers 260 between the stiffener 270 and the light guide 110.

In one or more embodiments, one or more overlays 280 can be disposed proximate the upper surface 115 of the light guide 110. The one or more overlays 280 can be a transparent material a semi-transparent material, an opaque material or combinations thereof. In one or more specific embodiments, the surface of the one or more overlays 280 proximate the light guide 110 can reflect all or a portion of the light emitted from the upper surface 115 back into the light guide 110. In one or more embodiments, the surface of the one or more overlays 280 can prevent the transmission of all or a portion of the light emitted from the upper surface 115 of the light guide 110 to the external environment surrounding the light guide 110.

Figure 3A:
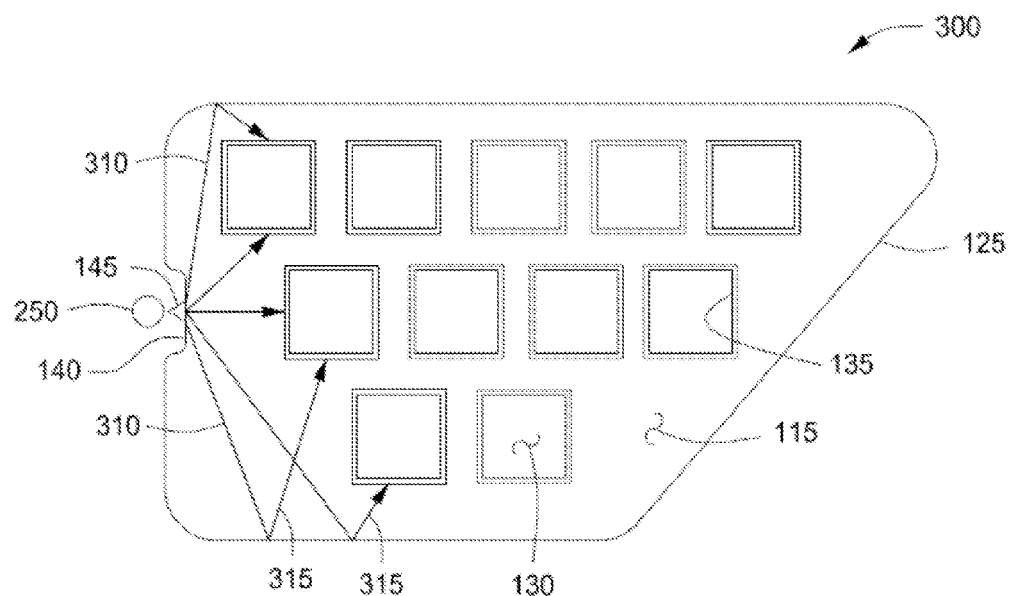
FIG. 3A depicts a plan view of light dispersion within an illustrative light guide according to one or more embodiments described.
Figure 3B:
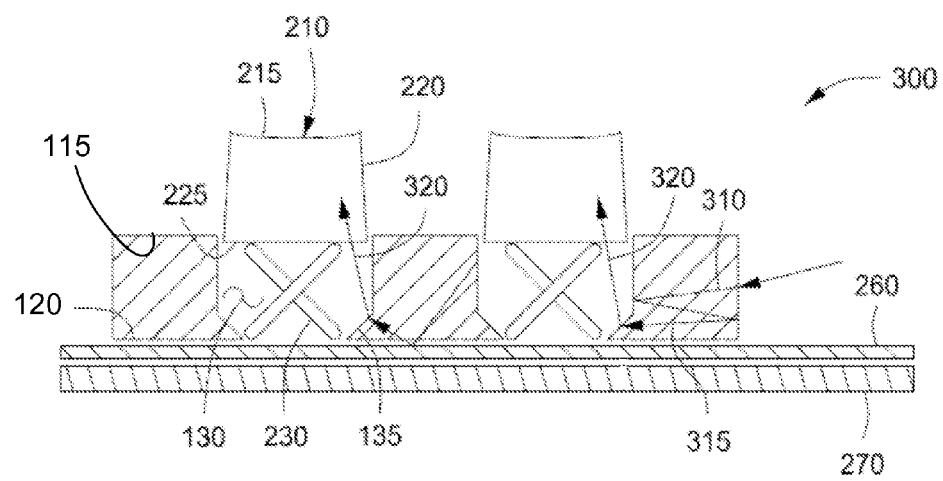
FIG. 3B depicts a complementary elevation view of light dispersion within an illustrative light guide 110 according to one or more embodiments described.

FIG. 3A is a plan view depicting light dispersion within an illustrative apparatus 300 according to one or more embodiments. FIG. 3B is a complementary cross-sectional elevation depicting light dispersion within an illustrative apparatus 300 according to one or more embodiments. In one or more embodiments, all or a portion of the light 310 provided by the one or more light sources 250 can be directed or otherwise transmitted into the light guide 110. Within the light guide 110, at least a portion of the transmitted light 310 can directly enter the one or more apertures 130. At least a portion of the transmitted light 310 within the light guide 110 can reflect from one or more surfaces, for example the edge 125 of the light guide, and/or the edge of one or more apertures 130, providing reflected light 315.

All or a portion of the light 310 and reflected light 315 transmitted through the light guide 110 can exit the light guide as transmitted light 320 via the one or more dispersion features 135 disposed in, on, or about each of the one or more apertures 130. The one or more dispersion features 135 can propagate the transmitted light 320 towards the upper surface 115 of the light guide 110. The upward motion of the transmitted light 320 can illuminate the one or more keys 210 disposed in the one or more apertures 130.

In one or more embodiments, the use of a reflective layer 260 proximate the light guide 110 can assist in reflecting all or a portion of the light transmitted from the bottom surface 120 of the light guide 110 back into the light guide 110. Similarly the use of a reflective overlay 280 proximate the upper surface 115 of the light guide 110 can assist in reflecting all or a portion of the light transmitted from the upper surface 115 of the light guide 110 back into the light guide 110.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A user interface apparatus comprising:
   a keyboard comprising one or more keys; wherein each of the one or more keys comprise a key base and a key top;
   a light guide comprising an edge, a first surface and a second surface; the first surface disposed about the key base of all or a portion of the one or more keys; the light guide having one or more apertures disposed therethrough, wherein each of the one or more apertures corresponds to one or more keys; an interior surface of all or a portion of the one or more apertures having one or more dispersion features disposed proximate thereto, the one or more dispersion features to transmit at least a portion of the light from the light guide to the base of all or a portion of the one or more keys proximate the one or more apertures by refracting light incident on the dispersion feature;

one or more stiffeners extending partially or completely beneath all or a portion of the one or more keys.

2. The apparatus of claim 1, wherein the one or more stiffeners are disposed proximate the second surface of the light guide.

3. The apparatus of claim 1, wherein the one or more stiffeners comprise a single, rigid, member.

4. The apparatus of claim 1, further comprising: one or more layers disposed proximate the second surface of the light guide and the one or more stiffeners, forming an intermediate layer therebetween.

5. The apparatus of claim 4, wherein the one or more layers comprise one or more materials reflective to the visible light spectrum.

6. The apparatus of claim 4, wherein the one or more layers comprise a mylar membrane.

7. The apparatus of claim 1, further comprising disposing one or more overlays proximate the first surface of the light guide.

8. The apparatus of claim 1, wherein the one or more dispersion features disposed in, on, or about the one or more apertures comprise a wedge-shaped dispersion feature;
wherein at least one surface of the dispersion feature is coplanar with all or a portion of the second surface of the light guide;
wherein the apex of the wedge-shaped dispersion feature is disposed distal from an interior surface the aperture; and
wherein the apex angle of the wedge-shaped dispersion feature ranges about 15° to about 60° measured with respect to the second surface.

9. The apparatus of claim 1, further comprising disposing proximate the one or more edges of the light guide one or more recesses and one or more light sources;
wherein the one or more light sources are selected from the group consisting of: one or more light emitting diodes (LEDs), one or more incandescent lamps, one or more fluorescent lamps, one or more neon lamps, and one or more halogen lamps.

10. The apparatus of claim 9, further comprising disposing one or more dispersion elements in, on, or about at least one of the one or more recesses.

11. A method for illumination of a user interface apparatus, comprising:
illuminating one or more edges of a light guide disposed proximate a keyboard, the keyboard comprising:
one or more keys, the one or more keys each having a key base and a key top;
a light guide comprising an edge, a first surface and a second surface; the first surface disposed about the key base of all or a portion of the one or more keys; the light guide having one or more apertures disposed therethrough, wherein each of the one or more apertures corresponds to one or more keys; an interior surface of all or a portion of the one or more apertures having one or more dispersion features disposed proximate thereto, the one or more dispersion features to transmit at least a portion of the light from the light guide to the base of all or a portion of the one or more keys proximate the one or more apertures by refracting light incident on the dispersion feature;

one or more stiffeners extending partially or completely beneath one or more of the keys forming the plurality of keys.

12. The method of claim 11, wherein the illumination is provided by disposing proximate the one or more edges of the light guide one or more recesses and one or more light sources;
wherein the one or more light sources are selected from the group consisting of: one or more light emitting diodes (LEDs), one or more incandescent lamps, one or more fluorescent lamps, one or more neon lamps, and one or more halogen lamps.

13. An interface apparatus comprising:
a keyboard comprising one or more keys, wherein each key comprises a key base, a key top, and a key switch;
a light guide comprising an edge, a first surface and a second surface; the first surface disposed about the key base of all or a portion of the one or more keys; the light guide having one or more apertures disposed therethrough, wherein each of the one or more apertures corresponds to one or more keys; an interior surface of all or a portion of the one or more apertures having one or more dispersion features disposed proximate thereto, the one or more dispersion features to transmit at least a portion of the light from the light guide to the base of all or a portion of the one or more keys proximate the one or more apertures by refracting light incident on the dispersion feature;
one or more recesses disposed in, on, or about the light guide; wherein one or more dispersion elements are disposed in, on, or about at least one of the one or more recesses; and wherein one or more light sources are disposed in at least one of the one or more recesses;
one or more stiffeners extending partially or completely beneath all or a portion of the one or more keys; and
one or more layers disposed proximate the second surface of the light guide and the one or more stiffeners, forming one or more layers therebetween; wherein all or a portion of at least one of the one or more layers extends partially or completely beneath at least one of the one or more apertures.

14. The apparatus of claim 13, wherein the one or more dispersion features disposed in, on, or about the one or more apertures comprise a wedge-shaped dispersion feature;
wherein at least one surface of the dispersion feature is coplanar with all or a portion of the second surface of the light guide;
wherein the apex of the wedge-shaped dispersion feature is disposed distal from an interior surface the aperture; and
wherein the apex angle of the wedge-shaped dispersion feature ranges about 15° to about 60° measured with respect to the second surface.

15. The apparatus of claim 13, further comprising disposing proximate the one or more edges of the light guide one or more recesses and one or more light sources;
wherein the one or more light sources are selected from the group consisting of: one or more light emitting diodes (LEDs), one or more incandescent lamps, one or more fluorescent lamps, one or more neon lamps, and one or more halogen lamps.

* * * * *